(12) United States Patent
Schneider et al.

(10) Patent No.: US 10,487,854 B2
(45) Date of Patent: Nov. 26, 2019

(54) VALVE DEVICE AND HYDRAULIC SYSTEM

(71) Applicants: BIERI HYDRAULIK AG, Liebefeld (CH); HYDAC Engineering AG, Steinhausen (CH)

(72) Inventors: Wolfgang Schneider, Thun (CH); Maxim Reichert, Horgen (CH)

(73) Assignees: BIERI HYDRAULIK AG, Liebefeld (CH); HYDAC ENGINEERING AG, Steinhausen (CH)

( * ) Notice: Subject to any disclaimer, the term of this patent is extended or adjusted under 35 U.S.C. 154(b) by 8 days.

(21) Appl. No.: 15/022,229

(22) PCT Filed: Sep. 5, 2014

(86) PCT No.: PCT/EP2014/002417
§ 371 (c)(1),
(2) Date: Mar. 16, 2016

(87) PCT Pub. No.: WO2015/039734
PCT Pub. Date: Mar. 26, 2015

(65) Prior Publication Data
US 2016/0230780 A1 Aug. 11, 2016

(30) Foreign Application Priority Data
Sep. 21, 2013 (DE) .................. 10 2013 015 774

(51) Int. Cl.
| | | |
|---|---|---|
| *F15B 1/027* | (2006.01) | |
| *F15B 13/02* | (2006.01) | |
| *F15B 1/04* | (2006.01) | |
| *F16K 15/02* | (2006.01) | |
| *F16K 31/122* | (2006.01) | |
| *F15B 11/02* | (2006.01) | |
| *F15B 13/00* | (2006.01) | |

(52) U.S. Cl.
CPC ............... *F15B 1/027* (2013.01); *F15B 1/04* (2013.01); *F15B 13/024* (2013.01);
(Continued)

(58) Field of Classification Search
None
See application file for complete search history.

(56) References Cited

FOREIGN PATENT DOCUMENTS

| DE | 33 18 246 | 11/1984 |
|---|---|---|
| DE | 44 18 524 | 11/1995 |

(Continued)

OTHER PUBLICATIONS

"19633539-Desc-en.pdf"; machine translation of DE 196 33 539, of record.*

(Continued)

*Primary Examiner* — John Fox
(74) *Attorney, Agent, or Firm* — Wenderoth, Lind & Ponack, L.L.P.

(57) ABSTRACT

A valve device (200) includes a tank pressure port (218), a first pressure port (212), a second pressure port (214), and a pressure shut-off valve (224). The valve is switched between the individual ports (212, 214, 218), and has two valve components (226, 228). Upon reaching a predefinable pressure cut-off value, the first pressure port (212) can be connected to the tank pressure port (218) by the first valve component (226). In the event of the fluid pressure being higher at the second pressure port (214) than at the first pressure port (212), the second pressure port (214) can be separated from the first pressure port (212) by the second valve component (228). Both valve components (226, 228) are combined to form a tradable structural unit and are integrated in a common valve housing (230), preferably making direct contact. A hydraulic system has this valve device.

23 Claims, 6 Drawing Sheets

(52) U.S. Cl.
CPC .......... *F15B 13/027* (2013.01); *F16K 15/026* (2013.01); *F16K 31/1221* (2013.01); *F15B 11/022* (2013.01); *F15B 2013/004* (2013.01); *F15B 2201/411* (2013.01); *F15B 2201/413* (2013.01); *F15B 2211/30505* (2013.01); *F15B 2211/50518* (2013.01); *F15B 2211/50554* (2013.01); *F15B 2211/5157* (2013.01); *F15B 2211/5158* (2013.01); *F15B 2211/625* (2013.01); *F15B 2211/775* (2013.01)

(56) References Cited

FOREIGN PATENT DOCUMENTS

| | | |
|---|---|---|
| DE | 196 33 539 A1 | 2/1998 |
| DE | 196 33 539 C2 | 2/1998 |
| DE | 10 2005 011 138 | 9/2006 |
| GB | 2 276 918 | 10/1994 |

OTHER PUBLICATIONS

L1-abschaltventil_hytorc.pdf. Catalogue [online]. Hytorc, 2007 [retrieved Oct. 10, 2017]. Retrieved from the internet: <URL:https://www.hytorctech.com/fileadmin/download/Abschaltventil_hytorc.pdf>.*

International Search Report (ISR) dated Jan. 22, 2015 in the International (PCT) Application No. PCT/EP2014/002417.

"Abschaltventile ASE und ASG Cutoff Valves ASE and ASG", Mar. 1, 2007, XP055161580, Retrieved from the Internet: URL:http://www.hydrower.de/PDF/abschaltventile.pdf [retrieved on Jan. 31, 2015], cited in the ISR.

\* cited by examiner

VALVE DEVICE AND HYDRAULIC SYSTEM

FIELD OF THE INVENTION

The invention relates to a valve device comprising at least one tank pressure port, a first pressure port, a second pressure port, and a pressure shut-off valve. The pressure shut-off valve is switched between the individual ports and has at least two valve components. Upon reaching a predefinable pressure shut-off value, the first pressure port can be connected to the tank pressure port by the first valve component. In the event of the fluid pressure being higher at the second pressure port than at the first pressure port, the second pressure port can be separated from the first pressure port by the second valve component. The invention further relates to a hydraulic system having such valve device.

BACKGROUND OF THE INVENTION

Such valve devices are known from the prior art. A commonly marketed pressure shut-off valve has a pressure limiting valve controlled externally by the consumer pressure and a non-return valve. The pressure shut-off valve is mainly used in dual-circuit hydraulic systems, which have a low-pressure circuit with a low-pressure pump and a high-pressure circuit with a high-pressure pump. The volume flow rates of the hydraulic circuits are combined for the same consumer. The low-pressure circuit usually undertakes the rapid movement of the consumer at a lower pressure and a higher volume flow rate. The high-pressure circuit ensures the subsequent application of force, in the case of tensioning, for example, at a higher pressure and a lower volume flow rate. The high-pressure circuit is additionally usually protected by its own pressure limiting valve.

The pressure shut-off valve is used for the pressure-dependent shut-off of the delivery flow of the low-pressure circuit. As soon as the shut-off pressure set at the pressure limiting valve is reached at the consumer, the pressure limiting valve is fully opened. In this way, the fluid pressure upstream of the non-return valve drops, so that the non-return valve closes and separates the consumer from the low-pressure pump. The delivery flow of the low-pressure pump is thus switched to low-loss circulation to the tank via the fully opened pressure limiting valve. In this state, only the high-pressure pump is still supplying the consumer. If the consumer pressure again sinks below a set shut-off pressure, the low-pressure delivery flow is again connected to the consumer.

A constant demand on the part of the users of such pressure shut-off valves is for the valves to be produced in a more compact form and more economically, designed to function reliably.

In addition to the above-mentioned general pressure shut-off valves, specialized valve devices are also used in hydraulics, which are intended for the controlled loading and, if necessary, reloading of storage-capable hydraulic systems, in particular hydraulic accumulators or accumulators. In such arrangements, usually only a pressure circuit or a pump is used. When a desired, predefinable pressure is reached in the accumulator, a pressure limiting valve switches the pump volume flow rate to low-loss circulation, while a non-return valve ensures that the pressure in the storage-capable hydraulic system is maintained. Characteristic of such valve arrangements, which are also referred to as accumulator charging valves, is the behavior in the case of dropping pressure in the storage-capable hydraulic system. If the accumulator pressure drops as a result of a temperature change, a leakage, or as a result of conventional consumption, the valve device ensures that the pressure limiting valve does not close again immediately, thus initiating the reloading process. Instead the closing of the pressure limiting valve occurs only when a predefinable limit pressure is not reached. Due to this measure, the storage-capable hydraulic system is reloaded less often. The known accumulator charging valves require a very large installation space, however.

SUMMARY OF THE INVENTION

An object of the invention is to provide an improved valve device and a hydraulic system having such an improved valve device, which have a smaller construction, have a lower purchase price and are reliable during operation.

This object is basically achieved by a valve device and a hydraulic system having two valve components combined to form a marketable structural unit. For this purpose, both valve components are integrated in a common valve housing, preferably making direct contact. In this way the required installation space for the valve is reduced to a minimum. Just one unit needs to be installed, instead of the usual two or three valves. Less fluid-carrying lines need to be provided and fewer connection points are present where leakage could occur, increasing the functional reliability during operation.

The pressure shut-off valve according to the invention, being designed as building blocks composed of individual modular components, can be produced particularly inexpensively in the context of a series production. Producing, storing, delivering and, if necessary, maintaining three individual valves is no longer necessary. This characteristic makes things much simpler for a user of the new valve device solution. The design engineer of the valve devices according to the invention no longer has to dimension individual valves, but can directly adapt the structural unit as a whole according to the conditions at the location. In the event of a malfunctioning of the system, the structural unit as a whole can be efficiently replaced. Determining at which valve a malfunction occurred is no longer necessary.

Where both valve components are integrated into a common valve housing as a marketable structural unit, the valve housing can have an integral housing part, preferably in a screw-in cartridge form. The cartridge form is also referred to in technical terms as a cartridge valve solution. The integrated housing part is closed off at least on one frontal end, preferably on both opposite frontal ends, by a separate housing cover.

Alternatively, the valve housing can be assembled from individual housing parts. Ultimately, the important thing is that the valve housing with its individual ports at the location of the installation in a hydraulic overall system represents the marketable structural unit as a whole in a common enveloping or encasing valve housing element.

Advantageously, the first valve component is a pressure limiting valve, and the second valve component is a non-return valve, which opens in the direction of the second pressure port.

A pressure limiting valve piston of the pressure limiting valve, longitudinally-displaceably guided inside the valve housing, can be activated on one of its sides by a pressure limiting valve energy accumulator, preferably in the form of a pressure spring. On its other side, the pressure limiting valve piston can be activated on by the fluid pressure at the second pressure port, in particular via a control piston at least contacting the pressure limiting valve piston. In this way, the pressure shut-off as a function of the fluid pressure at the second pressure port is guaranteed. The pressure shut-off value is predefined by the pressure limiting valve energy accumulator, in particular its spring stiffness and preload. This arrangement allows the fluid pressure present at the first pressure port to be transferred to the tank pressure port, when the fluid pressure at the second pressure port is sufficiently high, in particular higher than the predefinable pressure shut-off value.

Still more preferably, the pressure limiting valve piston is guided at least partially in a control chamber inside the valve housing. The first pressure port can then be connected to the tank pressure port via a valve gap. The pressure limiting valve piston is provided, in the direction of the pressure limiting valve energy accumulator, with a diameter extension, preferably in the form of a valve cone, to control a flow volume at the valve gap. The form of the pressure limiting valve piston is therefore ideal for the purpose of flow optimization.

Particularly preferably, a fluid connection is provided for a pressure compensation of the pressure limiting valve piston between its piston side facing the control piston and its piston side facing the pressure limiting valve energy accumulator. As a result of the pressure compensation, the force input required to move the pressure limiting valve piston is significantly reduced. The components can then be designed larger and the springs weaker. The large opening area on the valve seat of the pressure limiting valve favors low-loss flow off of the delivery flow at the first pressure port to the tank pressure port, without this necessitating a larger design of the non-return valve. The non-return valve is arranged in a narrower zone of the valve housing. The limited construction volume in the valve housing is thus optimally employed.

Preferably, a piston-shaped control unit is arranged between the pressure limiting valve energy accumulator and the pressure limiting valve piston. The piston-shaped control unit makes assembly of the valve device easier. It additionally permits a compensation of an angular offset between the pressure limiting valve piston and the pressure limiting valve energy accumulator due to production tolerances.

Advantageously, a non-return valve piston of the non-return valve is activated by a non-return valve-energy accumulator, in particular in the form of a spring, and is held in its closed position on a non-return valve seat.

Particularly preferably, the non-return valve piston is designed as a hollow piston and is preferably guided by the control piston. Still more preferably, the non-return valve piston is sealed relative to the control piston by a sealing arrangement, which more preferably is made up of an external sealing ring made from a low-friction sliding material and an internal O-ring type preload element. The sealing arrangement is more preferably arranged in the non-return valve piston or in the control piston. This construction is particularly compact and easy to produce due to the rotationally symmetrical design. In addition, it simplifies assembly of the valve device.

According to another advantageous embodiment, a second pressure limiting valve is provided for limiting the pressure at the second pressure port, which is preferably arranged in the valve housing, and which is more preferably in the piston-like control unit. The second pressure limiting valve permits protection of the second pressure port from harmful excess pressure. As a result of the valve housing-integrated design, an external pressure limiting valve and the connection lines it requires can be omitted. The risk of leakage is thus significantly reduced.

The second pressure limiting valve preferably has its own, second pressure limiting valve piston. The second pressure limiting valve piston is activated on one side by the fluid pressure at the second pressure port and on an opposite side by the pressure limiting valve energy accumulator of the first pressure limiting valve or its own, second pressure limiting valve energy accumulator, preferably in the form of a spring. In addition, the second pressure limiting valve energy accumulator can be subject to a preload, which is advantageously adjustable. When the first pressure limiting valve energy accumulator is used to close the second pressure limiting valve piston, the opening pressure value of the second pressure limiting valve is directly proportional to the pressure shut-off value adjusted at the first pressure limiting valve energy accumulator. When a separate second pressure limiting valve energy accumulator with adjustable preload is used, the opening pressure of the second pressure limiting valve can be adjusted irrespective or independently of the set pressure shut-off value.

Advantageously, the pressure limiting valve piston or the control piston has a pressure surface, at which the fluid pressure at the first pressure port is applied such that it counteracts the fluid pressure at the second pressure port. Thus, the pressure limiting valve piston or the control piston is pressurized on a control side by the fluid pressure at the first pressure port and on an opposite, second control side by the fluid pressure at the second pressure port. The valve device can then be used for the controlled loading of a storage-capable hydraulic system which, instead of a consumer, is connected to the second pressure port of the valve device. Due to the pressure surface, the pressure limiting valve energy accumulator is supported by the fluid pressure to which the first pressure port is subjected. The pressure limiting valve opens when the force of the fluid pressure acting on the control piston or on the pressure limiting valve piston at the second pressure port exceeds the sum of the forces of the pressure limiting valve energy accumulator, the fluid pressure at the first pressure port and the tank pressure. Meanwhile, the non-return valve ensures that the pressure in the storage-capable hydraulic system is maintained, while the pump volume flow rate is set to low-loss circulation to the tank. Because the force of the fluid pressure at the first pressure port advantageously reduces the force of the fluid pressure at the second pressure port, the storage-capable hydraulic system can be unloaded to the point where a lower storage limit pressure is obtained. Only when this storage limit pressure is not achieved that, advantageously, the pressure limiting valve is closed and a reloading process is initiated.

Particularly advantageously, at least one hydraulic consumer can be connected to the second pressure port as a service port. The fluid flow can then advantageously be used for driving a hydraulic motor and/or a hydraulic cylinder. The pressure shut-off valve is advantageously controlled via the load pressure of the consumer or consumers. In a rapid movement, the load pressure is less than the pressure shut-off value, so that the first valve component, the first pressure limiting valve, is in the closed position. Also, the delivery flow at the first pressure port, in particular coming from a low-pressure pump, is delivered via the second valve component, the non-return valve, into the consumer. If the load pressure at the consumer increases, for example, because the consumer has almost reached an end position, and a high pressure is required for tensioning, then the first valve component opens and allows a flow off of the fluid present at the first pressure port in the direction of the tank pressure port. As a result, the fluid pressure at the first pressure port drops, and the second valve component passes into the closed position, thus ensuring that fluid from the second pressure port cannot flow back to the first pressure port. If the load pressure on the hydraulic consumer were to further increase, the second pressure limiting valve protects the valve device and the entire hydraulic circuit from a harmful overload.

All pistons and piston-like parts are independent components or at least the control piston and the first pressure limiting valve piston are designed as integral components. By combining individual components in larger overall components, the plurality of parts at assembly time can be reduced. Furthermore, the overall components are often cheaper to produce than several individual components. This characteristic is the case in particular when the parts can be produced by lathing.

The valve housing preferably has a cartridge construction. This construction is particularly inexpensive and compact.

In addition, a stop can advantageously be provided in the valve housing. The stop serves to limit the axial displacement of the first pressure limiting valve piston and/or of the control piston. The stop can cooperate with the first pressure limiting valve piston, the control piston or the piston-like control unit. Limiting the displacement prevents the control piston and/or the first pressure limiting valve piston from being able to be pressed out of their guide. Furthermore, a secure guidance of the hollow piston of the non-return valve on the control piston is ensured.

The hydraulic system according to the invention having such a valve device is characterized in that the tank pressure port is connected to a supply tank; the first pressure port is connected to a low-pressure pump; and the second pressure port is connected to a high-pressure pump and to at least one hydraulic consumer.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
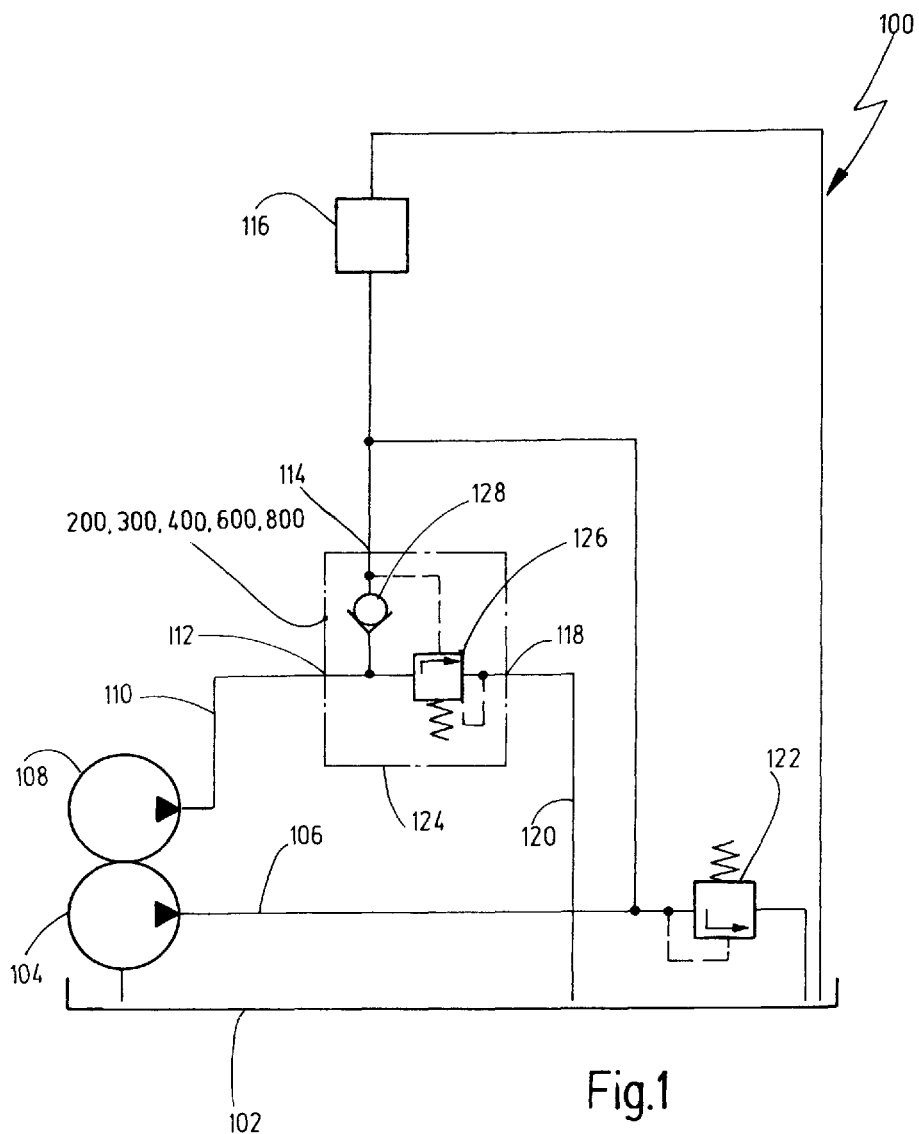
FIG. 1 is a schematic diagram of the construction of a hydraulic system according to the invention.

FIG. 1 shows a hydraulic system 100 according to the invention. More detailed longitudinal sections through various embodiments of a valve device 200; 300; 400; 600; 800 installed therein emerge from FIGS. 2 through 6.

In the hydraulic system 100, fluid is pumped from a tank 102 into a high-pressure circuit 106 by a high-pressure pump 104 and into a low-pressure circuit 110 by a low-pressure pump 108. The low-pressure pump 108 is connected to a first pressure port 112; 212; 312; 412; 612; 812 of the valve device 200; 300; 400; 600; 800. The high-pressure pump 104 and at least one consumer 116 are connected to a second pressure port 114; 214; 314; 414; 614; 814 of the valve device 200; 300; 400; 600; 800. Finally, the valve device 200; 300; 400; 600; 800 has a tank pressure port 118; 218; 318; 418; 618; 818, to which a line 120 that leads to the tank 102 is connected. To protect the high-pressure circuit 106, a second pressure limiting valve 122; 422 is provided. This second pressure limiting valve is connected downstream of the high-pressure pump 104 and parallel to the consumer 116 and to the valve device 200; 300; 400; 600; 800, and permits a transfer in the direction of the tank 102 in the event of a harmful excess pressure. The pumps 104, 108 mentioned can be collectively powered by a drive, for example, in the form of an electric motor, which is not depicted in greater detail for the sake of simplicity.

The valve devices 200; 300; 400; 600; 800 shown in greater detail in FIGS. 2 through 6 have at least one tank pressure port 118; 218; 318; 418; 618; 818, a first pressure port 112; 212; 312; 412; 612; 812, a second pressure port 114; 214; 314; 414; 614; 814 and a pressure shut-off valve 124; 224; 324; 424; 624; 824. The pressure shut-off valve is switched between the individual ports 112, 114, 118; 212, 214, 218; 312, 314, 318; 412, 414, 418; 612, 614, 618; 812, 814, 818 and has two valve components 126, 128; 226, 228; 326, 328; 426, 428; 626, 628; 826, 828. Upon reaching a predefinable pressure shut-off value, the first pressure port 112; 212; 312; 412; 612; 812 can be connected to the tank pressure port 118; 218; 318; 418; 618; 818 by the first valve component 126; 226; 326; 426; 626; 826, a first pressure limiting valve. In the event of the fluid pressure being higher at the second pressure port 114; 214; 314; 414; 614; 814 than at the first pressure port 112; 212; 312; 412; 612; 812, the second pressure port 114; 214; 314; 414; 614; 814 can be separated from the first pressure port 112; 212; 312; 412; 612; 812 by the second valve component 128; 228; 328; 428; 628; 828, a non-return valve, which opens in the direction of the second pressure port 114; 214; 314; 414; 614; 814. According to the invention, both valve components 126, 128; 226, 228; 326, 328; 426, 428; 626, 628; 826, 828 form a marketable structural unit. Here the movable valve components 126, 128; 226, 228; 326, 328; 426, 428; 626, 628; 826, 828 are integrated, making direct contact in all positions of these valve components, in a common valve housing 230; 330; 430; 630; 830.

As can be seen in the longitudinal sections, the valve devices 200; 300; 400; 600; 800 have a particularly compact and cheap to produce cartridge construction. Changes in diameter 232; 332; 432; 632; 832 and sealing elements 234; 334; 434; 634; 834 are provided at the ports 212, 214, 218; 312, 314, 318; 412, 414, 418; 612, 614, 618; 812, 814, 818. Provided inside the valve housing 230; 330; 430; 630; 830 is a longitudinally-displaceably guided first pressure limiting valve piston 236; 336; 436; 636; 836 of the first pressure limiting valve 226; 326; 426; 626; 826. The first pressure limiting valve piston can be activated on one of its sides 238; 338; 438; 638; 838 by a pressure limiting valve energy accumulator 240; 340; 440; 640; 840 in the form of a pressure spring. On its other side 242; 342; 442; 642; 842 the first pressure limiting valve piston is activated by the fluid pressure at the second pressure port 214; 314; 414; 614; 814 via a control piston 244; 344; 444; 644; 844 at least contacting the pressure limiting valve piston 236; 336; 436; 636; 836. The first pressure limiting valve piston 236; 336; 436; 636; 836 is guided in a control chamber 246; 346; 446; 646; 846 inside the valve housing 230; 330; 430; 630; 830 in a housing bore 248; 348; 448; 648; 848, and by the control chamber 246; 346; 446; 646; 846. The first pressure port 212; 312; 412; 612; 812 can be connected to the tank pressure port 218; 318; 418; 618; 818 via a valve gap 250; 350; 450; 650; 850. The pressure limiting valve piston 236; 336; 436; 636; 836 is provided, in the direction of the pressure limiting valve energy accumulator 240; 340; 440; 640; 840, with a diameter broadening 252; 352; 452; 652; 852 in the form of a valve cone to control a flow volume at the valve gap 250; 350; 450; 650; 850. The first pressure limiting valve piston 236; 336; 436; 636; 836 can be brought to bear on a valve seat 254; 354; 454; 654; 854 of the first pressure limiting valve 226; 326; 426; 626; 826 in its closed position. A piston-shaped control unit 256; 356; 456; 656; 856 is provided between the first pressure limiting valve piston 236; 336; 436; 636; 836 and the pressure limiting valve energy accumulator 240; 340; 440; 640; 840. The piston shaped control unit has an axial projection 258; 358; 658; 858 for guiding the pressure limiting valve energy accumulator 240; 340; 440; 640; 840 and a flange-shaped support surface 260; 360; 460; 660; 860 for the pressure limiting valve energy accumulator 240; 340; 440; 640; 840. The control chamber 246; 346; 446; 646; 846 is connected via several diagonal bores 262; 362; 462; 662; 862 to the first pressure port 212; 312; 412; 612; 812.

The first pressure limiting valve piston 236; 336; 436; 636; 836 is activated on the side 242; 342; 442; 642; 842 opposite the pressure limiting valve energy accumulator 240; 340; 440; 640; 840 by the control piston 244; 344; 444; 644; 844. The control piston 244; 344; 444; 644; 844 is also guided in a housing bore 264; 364; 448; 664; 864. The control piston 244; 344; 444; 644; 844 pressurizes the first pressure limiting valve piston 236; 336; 436; 636; 836 with the fluid pressure present at the second pressure port 214; 314; 414; 614; 814. Only in the embodiment of FIG. 2 is the control piston 244 provided with a change in diameter 266, so that it can be brought to bear on a stop 268 of the valve housing 230 for limiting the axial displacement of the control piston 244.

The control piston 244; 344; 444; 644; 844 projects into a second control chamber 270; 370; 470; 670; 870 formed at the end in the valve housing 230; 330; 430; 630; 830. The non-return valve 228; 328; 428; 628; 828 is provided in this second control chamber 270; 370; 470; 670; 870. This non-return valve opens in the direction of the second pressure port 214; 314; 414; 614; 814. The non-return valve 228; 328; 428; 628; 828 has a non-return valve piston 272; 372; 472; 672; 872 designed as a hollow piston, which hollow piston is brought to bear on a valve seat 274; 374; 474; 674; 874 of the non-return valve 228; 328; 428; 628; 828 in the closed position. For this purpose, the non-return valve piston 272; 372; 472; 672; 872 is pressurized on one side 276; 376; 476; 676; 876 by the fluid pressure at the first pressure port 212; 312; 412; 612; 812, which is conveyed via suitable diagonal bores 278; 378; 478; 678; 878 into the second control chamber 270; 370; 470; 670; 870, and on the opposite side 280; 380; 480; 680; 880 by the fluid pressure at the second pressure port 214; 314; 414; 614; 814 and a non-return valve spring 282; 382; 482; 682; 882. The non-return valve spring 282; 382; 482; 682; 882 is supported on a cover-shaped insert 284; 384; 484; 684; 884 of the valve housing 230; 330; 430; 630; 830. A sealing arrangement 286; 386; 486; 686; 886 is provided between the control piston 244; 344; 444; 644; 844 and the non-return valve piston 272; 372; 472; 672; 872. The sealing arrangement 286; 386; 486; 686; 886 is arranged in a peripheral groove 288; 388; 488; 688; 888 of the control piston 244; 344; 444; 644; 844. The sealing arrangement 286; 386; 486; 686; 886 has an external sealing ring sliding along the non-return valve piston 272; 372; 472; 672; 872 made from a low-friction sliding material and an internal O-ring type preload element. The sealing arrangement 286; 386; 486; 686; 886 can be a dynamic seal or a metal gap seal. In the latter case, low-level leakage must be anticipated.

Figure 2:
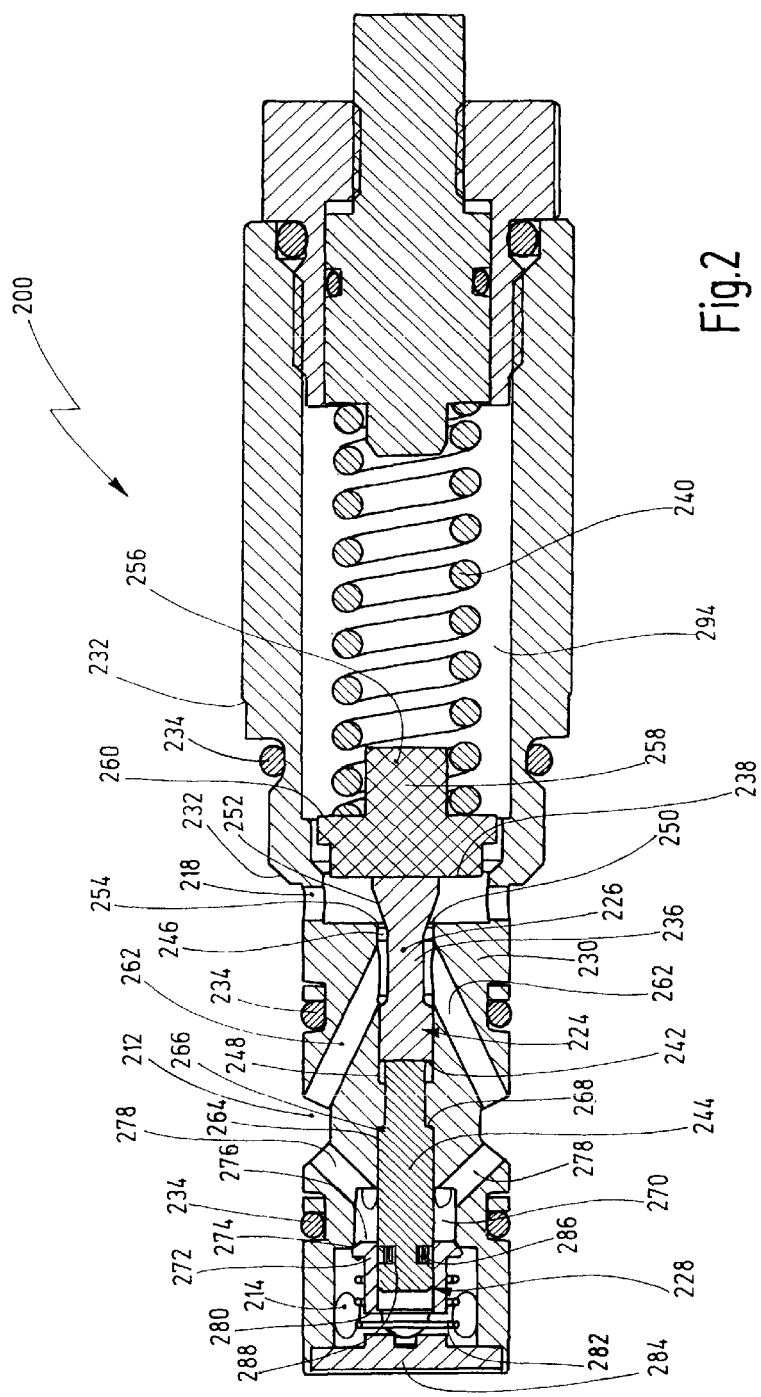
FIG. 2 is a side view in section of a pressure shut-off valve according to a first exemplary embodiment the invention.
Figure 3:
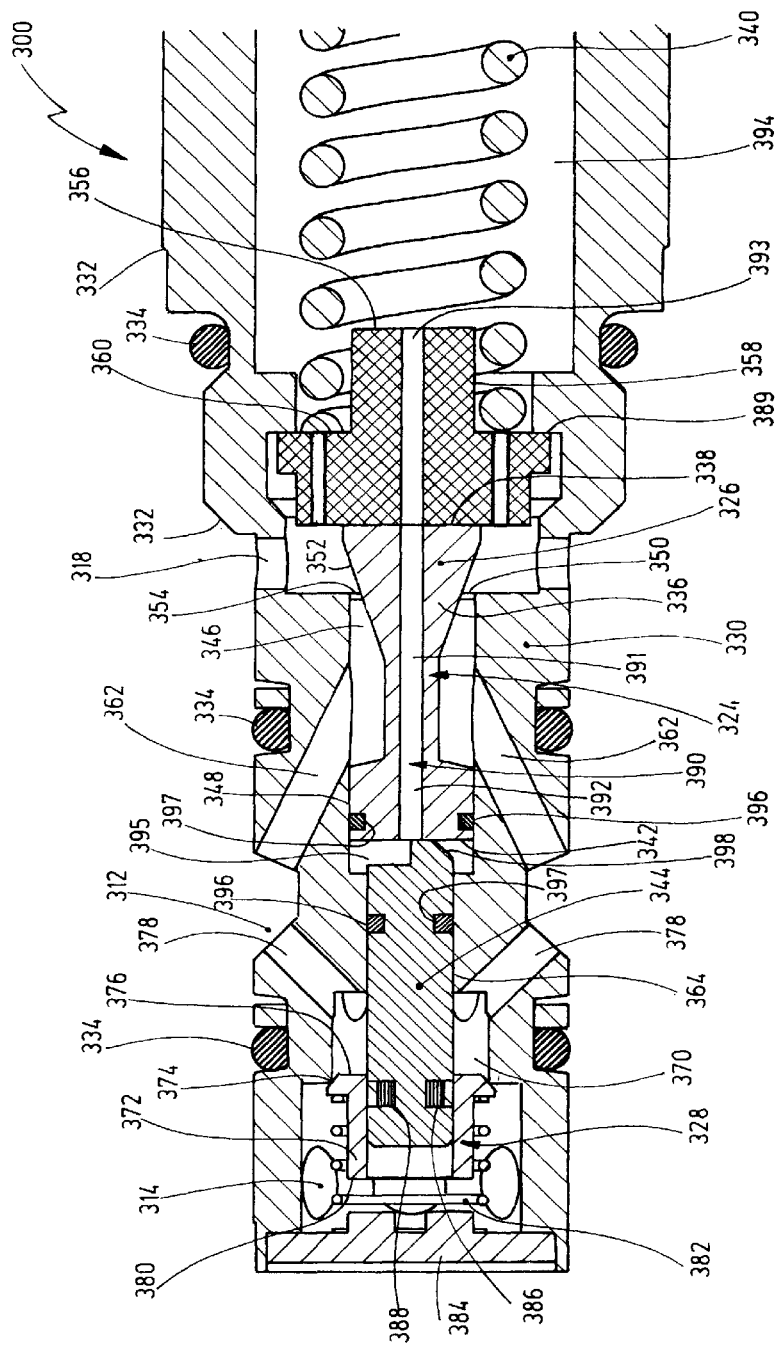
FIG. 3 is a side view in section of a pressure shut-off valve with pressure compensation according to a second exemplary embodiment of the invention.

The valve device 300 of FIG. 3 differs from the valve device 200 of FIG. 2 only in that a pressure compensation 390 for the first pressure limiting valve piston 336 and a stop 389 cooperating with the piston-shaped control unit 356 are provided.

For the pressure compensation 390 of the pressure limiting valve piston 336, a fluid connection 391 is provided between its piston side 342 facing the control piston 344 and its piston side 338 facing the pressure limiting valve energy accumulator 340. This fluid connection 391 is achieved by an axial bore 392. The fluid connection 391 is extended by a corresponding axial bore 393 in the control unit 356 into the spring chamber 394 of the first pressure limiting valve energy accumulator 340. In this way, the tank pressure can be fed back to the end face 342 of the first pressure limiting valve piston 336 on the left in the image plane. A pressure chamber 395 is additionally provided between the first pressure limiting valve piston 336 and the control piston 344. To form the pressure chamber 395, both the first pressure limiting valve piston 336 and the control piston 344 are sealed relative to the valve housing 330 with a sealing element 396 in each case. The sealing elements 396 are likewise dynamic seals or metal gap seals. The sealing elements 396 are arranged in peripheral grooves 397 of the first pressure limiting valve piston 336 and of the control piston 344. To create a space between the control piston 344 and the first pressure limiting valve piston 336, a lug 398 is provided on the end of the control piston 344. As a result of the pressure compensation 390, the pressure limiting valve piston 336 can be designed larger. The larger opening surface on the valve seat 354 of the first pressure limiting valve 326 favors the low-loss flow off of the delivery flow present at the first pressure port 312 to the tank pressure port 318, without this larger opening surface necessitating a larger design of the non-return valve 328, which is provided in the narrower second control chamber 370 of the valve housing 330. Thus, optimal advantage is taken of the limited construction volume of the valve device 300 with a cartridge construction.

Figure 4:
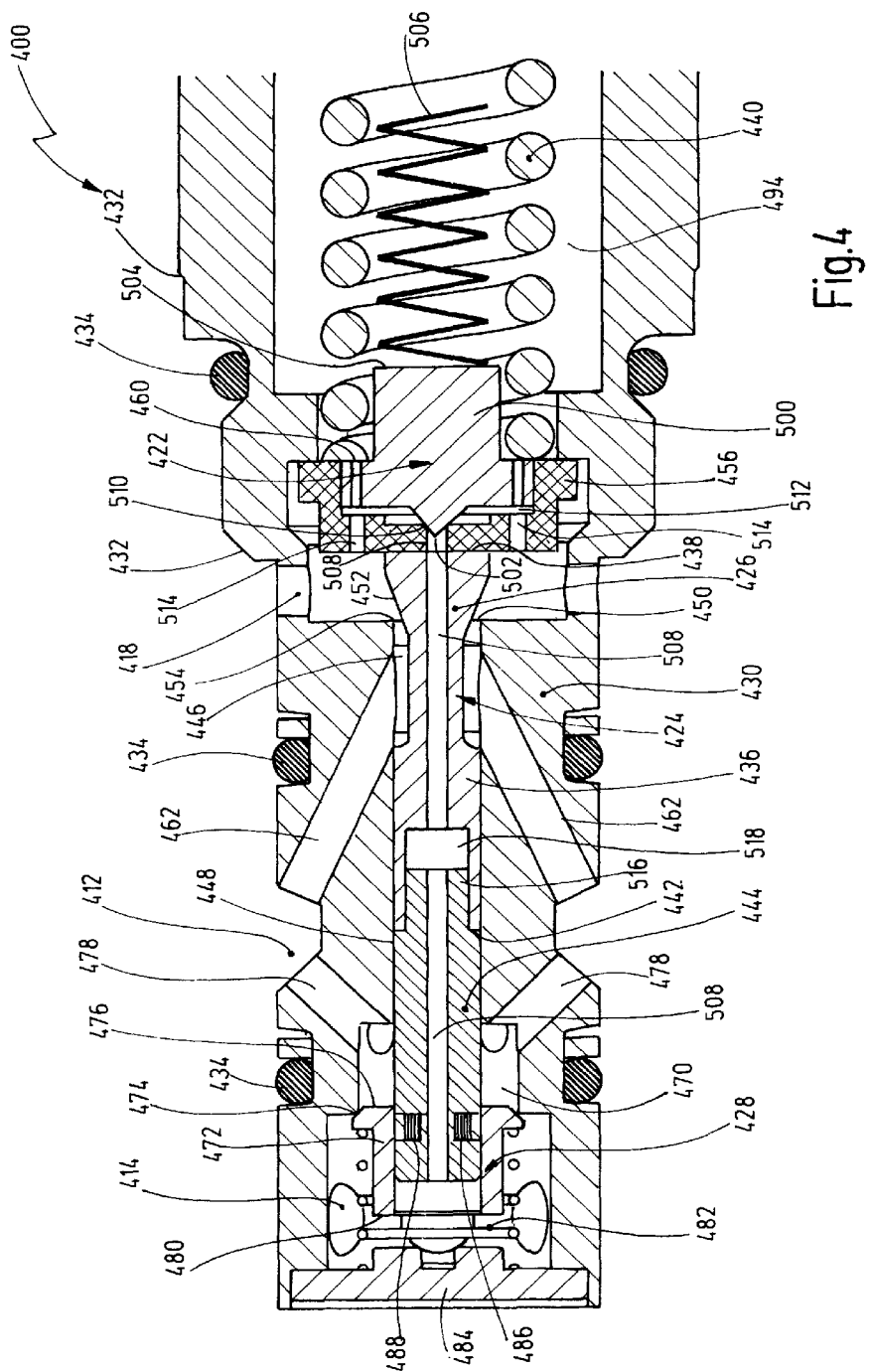
FIG. 4 is a side view in section of a pressure shut-off valve with a second pressure limiting valve as an integral component according to a third exemplary embodiment of the invention.

The embodiment 400 of the valve device according to FIG. 4 differs from the embodiment 300 of FIG. 3 in that, instead of the pressure compensation 390, a second pressure limiting valve 422 is integrated into the valve housing 430. The second pressure limiting valve 422 is arranged in the piston-like control unit 456 and is provided for limiting the pressure at the second pressure port 414. The second pressure limiting valve 422 has a second pressure limiting valve piston 500, which is activated on one side 502 by the fluid pressure at the second pressure port 414 and on an opposite side 504 by a second pressure limiting valve energy accumulator 506 in the form of another pressure spring. However in principle, the pressure limiting valve energy accumulator 440 could activate both the second pressure limiting valve piston 500 and the piston-like control unit 456, so that the second pressure limiting valve energy accumulator 506 can be omitted. For this purpose, axial bores 508 are provided in the control piston 444, in the first pressure limiting valve piston 436 and in the piston-shaped control unit 456. A valve chamber 512 is provided on the back side of the valve seat 510 of the second pressure limiting valve 422, which valve chamber 512 is connected in a fluid-carrying manner to the tank pressure port 418 via several bores 514. The second pressure limiting valve piston 500 is guided at the periphery in the piston-shaped control unit 456. The second pressure limiting valve energy accumulator 506 pressurizes a back side 504 of the second pressure limiting valve piston 500 with a preferably adjustable preload. To guide the control piston 444, the control piston 444 is provided with an axial projection 516 having a reduced external diameter, which engages in a recess 518 of the first pressure limiting valve piston 436.

Figure 5:
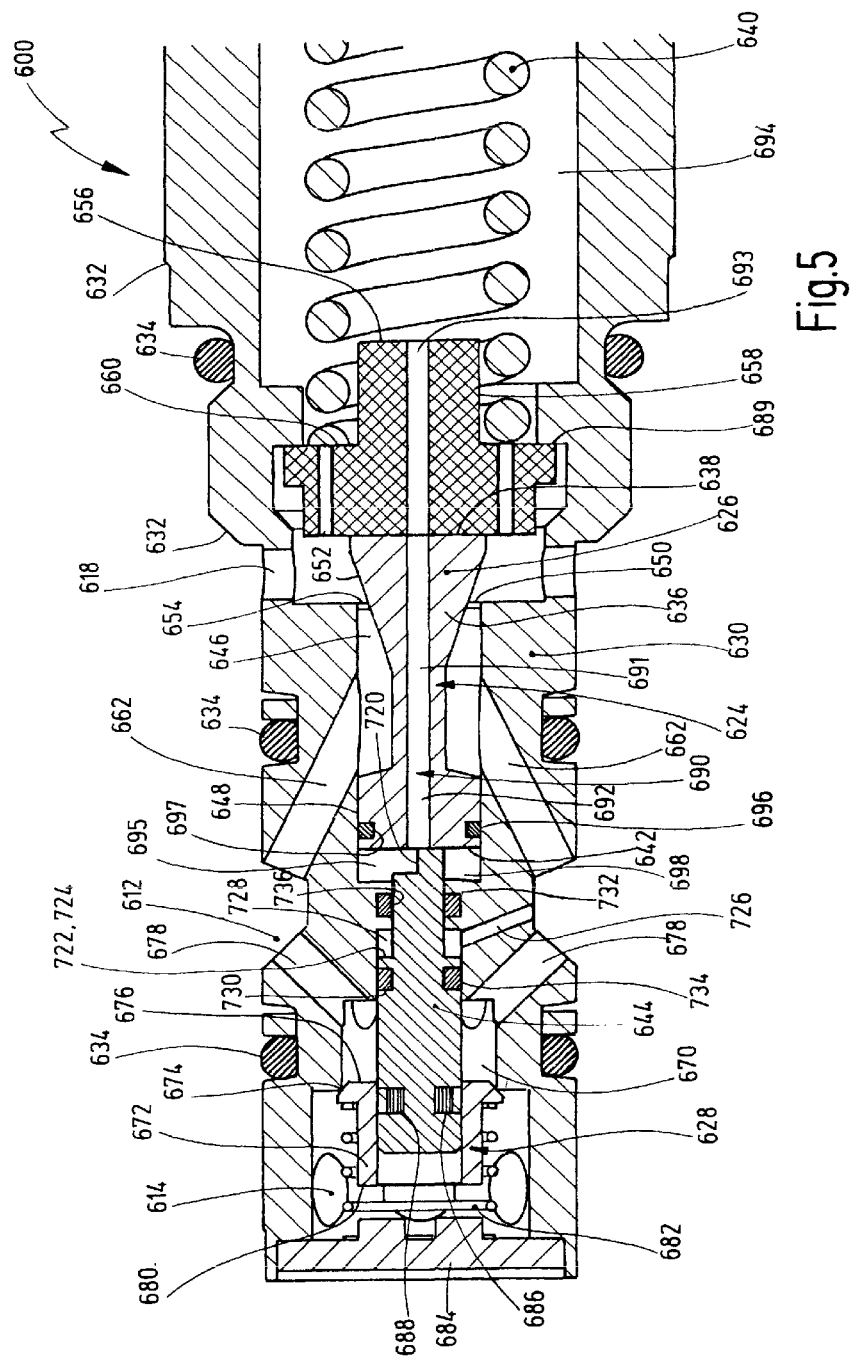
FIG. 5 is a side view in section of a pressure shut-off valve in the form of an accumulator charging valve according to a fourth exemplary embodiment of the invention.

The valve device 600 according to FIG. 5 differs from the valve device 300 of FIG. 3 only in that a step 722 is provided on the control piston 644 on the side 720 facing away from the second pressure port 614, forming a pressure surface 724. On the pressure surface 724, the fluid pressure can be applied at the first pressure port 612. For this purpose, at least one connection channel 726 in the form of a diagonal bore is provided and connects the first pressure port 612 to the pressure surface 724. In this way, a pressure chamber 728 is formed between the control piston 644 and the valve housing 630. To seal this pressure chamber 728, sealing elements in the form of ring seals 734, 736 are provided adjacent to pressure chamber 728 in peripheral grooves 730, 732 of the valve housing 630 and of the control piston 644. An accumulator charging valve is thus produced.

Figure 6:
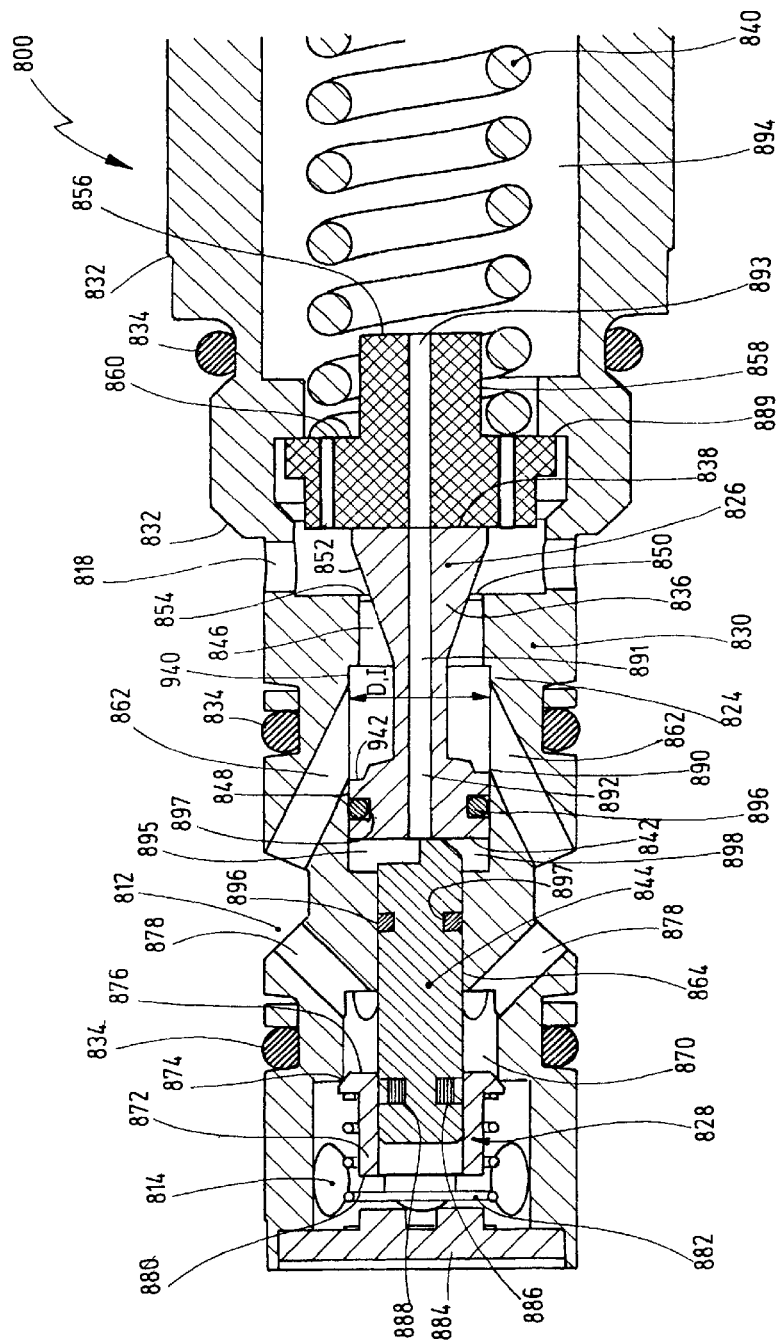
FIG. 6 is a side view in section of a pressure shut-off valve in the form of an accumulator charging valve according to a fifth exemplary embodiment of the invention.

The valve device 800 according to FIG. 6 differs from the valve device 300 of FIG. 3 only in that the pressure limiting valve piston 836 on the side facing the second pressure port 814, i.e. on the left end in the image plane, is larger in diameter D and is guided in a housing section 940 with a correspondingly enlarged internal diameter I. In this way, an enlarged pressure surface 942 is formed. On the pressure surface 942, the fluid pressure can be applied at the first pressure port 812 counteracting the effect of the fluid pressure at the second pressure port 814. In this way, a second embodiment of the valve device 800 in the form of an accumulator charging valve is produced.

All pistons 236, 244, 272; 336, 344, 372; 436, 444, 472; 500; 636, 644, 672; 836, 844, 872 and piston-shaped parts 256; 356; 456; 656; 856 are independent components in FIGS. 2 through 4. However, the control piston 244; 344; 444; 644; 844 and the first pressure limiting valve piston 236; 336; 436; 636; 836 can be an integral component.

The functioning of the valve device 200; 300; 400; 600; 800 is explained below.

The pressure shut-off valve 124; 224; 324; 424; 624; 824 is advantageously controlled via the load pressure of the at least one consumer 116. In a rapid movement, the load pressure is less than the pressure shut-off value, so that the first valve component 126; 226; 326; 426; 626; 826, the first pressure limiting valve, is in the closed position and the delivery flow at the first pressure port 112; 212; 312; 412; 612; 812, in particular coming from a low-pressure pump 108, is delivered via the second valve component 128; 228; 328; 428; 628; 828, the non-return valve, into the consumer 116. If the load pressure at the consumer 116 increases above a pressure shut-off value set via the first pressure limiting valve energy accumulator 240; 340; 440; 640; 840, for example because a high pressure is required for the tensioning at the consumer 116, then the first valve component 126; 226; 326; 426; 626; 826 opens and allows a flow off of the fluid present at the first pressure port 112; 212; 312; 412; 612; 812 in the direction of the tank pressure port 118; 218; 318; 418; 618; 818. As a result, the fluid pressure at the first pressure port 112; 212; 312; 412; 612; 812 drops and the second valve component 128; 228; 328; 428; 628; 828 passes into the closed position, thus ensuring that no fluid from the second pressure port 114; 214; 314; 414; 614; 814 can flow back to the first pressure port 112; 212; 312; 412; 612; 812 or can even flow to the tank pressure port 118; 218; 318; 418; 618; 818. In this way the delivery flow of the low-pressure pump 108 is diverted by the pressure shut-off valve 124; 224; 324; 424; 624; 824 with low loss and at a high load pressure at the consumer 116 in the direction of the tank 102.

If the load pressure at the hydraulic consumer 116 were to further increase, the second pressure limiting valve 122; 422 shown in FIGS. 1 and 4 protects the valve device 400 and the entire hydraulic circuit 100 from a harmful overload. In the embodiment of FIG. 4, the second pressure limiting valve 422 is advantageously integrated into the valve housing 430, which reduces the required installation space and helps to avoid any leakage losses.

Accumulator charging valves 600; 800 are shown in the embodiments of FIGS. 5 and 6. In these accumulator charging valves, an additional pressure surface 724; 942 is provided on the control piston 644 or on the pressure limiting valve piston 836, to which the fluid pressure at the first pressure port 612; 812 can be applied counteracting the effect of the fluid pressure at the second pressure port 614; 814. By this arrangement, a storage-capable hydraulic system can be connected to the second pressure port 614; 814 to be drained further, and thus, to delay the reloading.

The invention thus presents a valve device 200; 300; 400; 600; 800, which is built more compact and less expensively. By integrating the non-return valve 128; 228; 328; 428; 628; 828 and up to two pressure limiting valves 126; 226; 326; 422, 426; 626; 826 in a valve housing, which can additionally have a cartridge construction, the valve device is extremely economical in terms of installation space. Any leakage losses can be reduced to a minimum. As a whole, the valve device 200; 300; 400; 600; 800 according to the invention allows a low-pressure source 108 to be disconnected from a consumer 116 as a function of the fluid pressure present at the consumer 116 and to divert its delivery flow with low loss in the direction of the tank 102. In addition, the high-pressure source 104 can be protected via the second integrated pressure limiting valve 422.

While various embodiments have been chosen to illustrate the invention, it will be understood by those skilled in the art that various changes and modifications can be made therein without departing from the scope of the invention as defined in the claims.

The invention claimed is:

1. A valve device, comprising:
    a valve housing having a tank pressure port, a first pressure port and a second pressure port in said valve housing;
    a pressure limiting valve being in said valve housing and being switchable between said ports, said pressure limiting valve having a first valve component, said first valve component connecting said first pressure port to said tank pressure port upon fluid pressure at said second pressure port reaching a predefineable pressure limit value, said first valve component having a pressure limiting valve piston with first and second sides, said fluid pressure at said second pressure port being exerted on said second side of said pressure limiting valve piston via a control piston contacting or integral with said pressure limiting valve piston; and a second valve component separating said second pressure port from said first pressure port when said fluid pressure at said second pressure port is higher than a fluid pressure at said first pressure port and connecting said second pressure port and said first pressure port when said fluid pressure of said second pressure port is lower than said fluid pressure at said first pressure port, said second valve component being a non-return valve opening in a direction of said second pressure port, said first and second valve components forming a marketable structural unit and being integrated in said valve housing, said first and second valve components being integrated in said valve housing by directly contacting one another, said non-return valve being a hollow piston guided for movement along said control piston.

2. A valve device according to claim 1 wherein
said pressure limiting valve piston is longitudinally-displaceably guided for movement in said valve housing, said pressure limiting valve piston having said first side activated and biased by a pressure limiting valve energy accumulator and having said second side activated and pressured by fluid pressure at said second pressure port.

3. A valve device according to claim 2 wherein
said pressure limiting valve energy accumulator comprises a pressure spring.

4. A valve device according to claim 2 wherein
said fluid pressure at said second pressure port is exerted on said second side of said pressure limiting valve piston via said control piston contacting said pressure limiting valve piston.

5. A valve device according to claim 4 wherein
fluid pressure at said first pressure port is applied on said pressure limiting valve piston or said control piston to counteract fluid pressure at said second pressure port.

6. A valve device according to claim 2 wherein
said pressure limiting valve piston is guided at least partially in a control chamber inside said valve housing, said first pressure port being connectable to said tank pressure port via a valve gap between said pressure limiting valve piston having a diameter extension in a direction of said pressure limiting valve energy accumulator controlling flow volume of said valve gap.

7. A valve device according to claim 6 wherein
said diameter extension comprises a valve cone form.

8. A valve device according to claim 2 wherein
a fluid connection providing pressure compensation of said pressure limiting valve piston extends through and between said first and second sides of said pressure limiting valve piston.

9. A valve device according to claim 2 wherein
a piston-shaped control unit is between said pressure limiting valve energy accumulator and said pressure limiting valve piston.

10. A valve device according to claim 1 wherein
said hollow piston is biased by a non-return valve energy accumulator toward a closed position against a non-return valve seat in said valve housing.

11. A valve device according to claim 10 wherein
said non-return valve energy accumulator comprises a pressure spring.

12. A valve device according to claim 1 wherein
said hollow piston is sealed to said control piston by an external sealing ring of a low-friction sliding material and an internal O-ring preload element arranged in at least one of said hollow piston or said control piston.

13. A valve device according to claim 1 wherein
a second pressure limiting valve is in said valve housing and limits fluid pressure at said second pressure port.

14. A valve device according to claim 13 wherein
said pressure limiting piston is longitudinally-displaceably guided for movement in said valve housing, said pressure limiting valve piston having said first side activated and biased by a pressure limiting valve energy accumulator and having said second side activated and pressured by fluid pressure at said second pressure port;

a piston-shaped control unit is between said first pressure limiting valve energy accumulator and said pressure limiting valve piston; and said second pressure limiting valve is in said piston-shaped control unit.

15. A valve device according to claim 13 wherein
said pressure limiting valve is piston longitudinally-displaceably guided for movement in said valve housing, said pressure limiting valve piston having said first side activated and biased by a pressure limiting valve energy accumulator and having said second side activated and pressured by fluid pressure at said second pressure port; and said second pressure limiting valve comprises a second pressure limiting valve piston activated and contacted on a first side thereof by fluid pressure at said second pressure port and on an opposite second side thereof by at least one of said pressure limiting valve accumulator or a second pressure limiting valve accumulator.

16. A valve device according to claim 15 wherein
said second side of said second pressure limiting valve piston is activated and contacted by said second pressure limiting valve accumulator, said second pressure limiting valve accumulator comprising a pressure spring.

17. A valve device according to claim 15 wherein
said hollow valve piston biased by a non-return valve energy accumulator toward a closed position against a non-return valve seat in said valve housing; and each of said pistons are independent components.

18. A valve device according to claim 15 wherein
said hollow valve piston biased by a non-return valve energy accumulator toward a closed position against a non-return valve seat in said valve housing; and each of said pistons are independent components except for said pressure limiting valve piston and said control piston being integral.

19. A valve device according to claim 1 wherein
a hydraulic consumer is connected to said second pressure port.

20. A valve device according to claim 1 wherein
said valve housing has a cartridge construction.

21. A valve device according to claim 1 wherein
said valve housing only has three ports formed by said tank pressure port, said first pressure port and said second pressure port.

22. A hydraulic system, comprising
a valve housing having a tank pressure port, a first pressure port and a second pressure port in said valve housing;

a pressure shut-off valve being in said valve housing and being switchable between said ports, said pressure shut-off value having a first valve component, said first valve component connecting said first pressure port to said tank pressure port upon reaching a predefineable pressure shut-off value, said first valve component valve having a pressure limiting valve piston with first and second sides, said fluid pressure at said second pressure port being exerted on said second side of said pressure limiting valve piston via a control piston contacting or integral with said pressure limiting valve piston;

a second valve component separating said second pressure port from said first pressure port when a fluid pressure at said second pressure port is higher than a fluid pressure at said first pressure port and connecting said second pressure port and said first pressure port when said fluid pressure at said second pressure port is lower than said fluid pressure at said first pressure port, said second valve component being a non-return valve opening in a direction of said second pressure port, said first and second valve components forming a marketable structural unit and being integrated in said valve housing, said first and second valve components being integrated in said valve housing by directly contacting one another, said non-return valve being a hollow piston guided for movement along said control piston;

a supply tank connected to said tank pressure port;

a low-pressure pump connected to said first pressure port; and a high-pressure pump and a hydraulic consumer connected to said second pressure port.

23. A hydraulic system according to claim 22 wherein said valve housing only has three ports formed by said tank pressure port, said first pressure port and said second pressure port.

\* \* \* \* \*